(12) United States Patent
Takemi

(10) Patent No.: US 7,137,709 B2
(45) Date of Patent: Nov. 21, 2006

(54) IMAGE PROJECTOR

(75) Inventor: Kazutoshi Takemi, Daito (JP)

(73) Assignee: Funai Electric Co., Ltd., Daito (JP)

( * ) Notice: Subject to any disclaimer, the term of this patent is extended or adjusted under 35 U.S.C. 154(b) by 127 days.

(21) Appl. No.: 10/976,310

(22) Filed: Oct. 29, 2004

(65) Prior Publication Data
US 2005/0146688 A1    Jul. 7, 2005

(30) Foreign Application Priority Data
Oct. 29, 2003    (JP)    ............... 2003-369604

(51) Int. Cl.
*G03B 21/14* (2006.01)
*G03B 21/22* (2006.01)
*G03B 21/20* (2006.01)

(52) U.S. Cl. ................ 353/85; 353/119; 353/87

(58) Field of Classification Search ............ 353/85, 353/119, 122, 87; 267/158
See application file for complete search history.

(56) References Cited

U.S. PATENT DOCUMENTS

| 6,523,960 B1 * | 2/2003 | Watanabe | ............ 353/98 |
| 2003/0151920 A1 * | 8/2003 | Shin | ............ 362/282 |

FOREIGN PATENT DOCUMENTS

| JP | 60-221739 | 11/1985 |
| JP | 10-031163 | 2/1998 |
| JP | 10-268425 | 10/1998 |
| JP | 2002-139797 | 5/2002 |
| JP | 2002-333668 | 11/2002 |
| JP | 3092181 | 12/2002 |

OTHER PUBLICATIONS

Japanese Office Action dated Nov. 10, 2005, with English translation thereof (Four (4) pages).

* cited by examiner

*Primary Examiner*—Melissa Jan Koval
*Assistant Examiner*—Andrew Kong
(74) *Attorney, Agent, or Firm*—Crowell & Moring LLP

(57) ABSTRACT

An image projector allowing a lamp to be replaced alone. The lamp has lamp retention projections each extending from the periphery of a reflector. A lamp mounting member includes a plate with which the reflector of the lamp is brought into contact. The plate has a window, leaf springs, and positioning projections. Each of the leaf springs is arranged along the rim of the window with one end fixed on the plate and the other end free, and has a concave portion between the fixed end and the free end. When the lamp is placed on the positioning projections and turned clockwise, each of the lamp retention projections is inserted between the plate and the free end of each of the leaf springs to be received in the concave portion. Thus, the lamp is held on the lamp mounting member. When the lamp is turned counterclockwise, the lamp is released from the lamp mounting member.

3 Claims, 4 Drawing Sheets

IMAGE PROJECTOR

BACKGROUND OF THE INVENTION

1. Field of the Invention

The present invention relates to image projectors for projecting images onto a screen or the like.

2. Description of the Related Art

Conventionally, image projectors are known that, based on image data from a personal computer, a video camera, and the like, form images by an image forming element using light emitted from a lamp, and that project the images onto a screen or the like. This kind of image projectors have a lamp and an image forming element in a housing so that the lamp can be replaced when it becomes unusable due to its degradation, life or the like. In such an image projector, a lamp is housed in a box to form a lamp unit, which can be inserted into and removed from the housing of the projector (see, for example, Japanese laid-open patent publication Nos. 2002-333668 and Hei 10-31163, and Japanese utility model No. 3092161). When the lamp needs to be replaced, the lamp unit is removed from the housing for replacement.

However, in order to replace the lamp in the conventional image projector, the entire lamp unit has to be replaced as described above. In other words, not only the lamp but also the box in which the lamp is housed are replaced. This results in increase in cost because the cost of the box is required in addition to the cost of the lamp. This problem cannot be solved even if the technologies disclosed in the above mentioned references are applied.

SUMMARY OF THE INVENTION

The present invention has been made to solve the above mentioned problem, and an object of the present invention is to provide an image projector that allows a lamp to be replaced alone.

According to an aspect of the present invention, an image projector for projecting an image, comprises: a lamp having a lamp bulb for emitting light and a reflector for reflecting the light emitted from the lamp bulb; an image forming element for forming the image using the light from the lamp; a lamp mounting member adapted so that the lamp is attachable to and detachable from the lamp mounting member, thereby allowing the lamp to be replaced alone; and a housing in which the lamp, the image forming element, and the lamp mounting member are housed.

By such a configuration, the lamp can be attached to and detached from the lamp mounting member. This can eliminate the need for a conventional box to house the lamp, and the lamp can be replaced alone when it needs replacing. In other words, it is not necessary to replace a member other than the lamp when the lamp is replaced. Thus, the cost can be reduced.

Preferably, the lamp has a lamp retention projection, and the lamp mounting member includes a retainer for receiving the lamp retention projection so as to hold the lamp. It is preferable that the lamp retention projection extends outward from a peripheral edge of the reflector at a light emitting side; the lamp mounting member includes a plate with which the edge of the reflector of the lamp at the light emitting side is brought into contact, the plate having a window to pass the light emitted from the lamp; and the retainer is a leaf spring arranged along a rim of the window with one end fixed on the plate and the other end free, the leaf spring having a concave portion for receiving the lamp retention projection. Preferably, the reflector of the lamp is configured to be substantially round at the peripheral edge at the light emitting side; and the lamp mounting member further includes a positioning projection for positioning the lamp over the window, the positioning projection being located on the plate near the rim of the window so that the reflector of the lamp can be slidably placed thereon.

By such a configuration, the lamp can be attached to the lamp mounting member by turning the lamp in one direction with the reflector of lamp placed on the positioning projection. Detachment of the lamp is carried out by turning the lamp, which is held by the lamp mounting member, in the other direction. In such a manner, the lamp can be easily attached to and detached from the lamp mounting member in the housing, simply by turning the lamp. In other word, replacement of the lamp can be easily carried out.

Preferably, the image projector further comprises: a lamp door attached to the housing for opening and closing a lamp housing space in the housing where the lamp is placed; a temperature detecting lever that is a shape memory member having one end fixed on the lamp mounting member and the other end that is free and adapted to deform with temperature; and a door stopper coupled to the free end of the temperature detecting lever for locking the lamp door, wherein the lamp door has a door locking portion capable of catching the door stopper, and the door locking portion prohibits the lamp door from being opened under high temperature conditions while allowing the lamp door to be opened under ordinary temperature conditions.

By such a configuration, when the lamp is at a high temperature, the door stopper is actuated by the temperature detecting lever so as to be caught by the door locking portion of the lamp door. Thus, the lamp door is prohibited from being opened for lamp replacement.

DETAILED DESCRIPTION OF THE PREFERRED EMBODIMENT

Referring now to the accompanying drawings, an embodiment of the present invention will be described.

Figure 1:
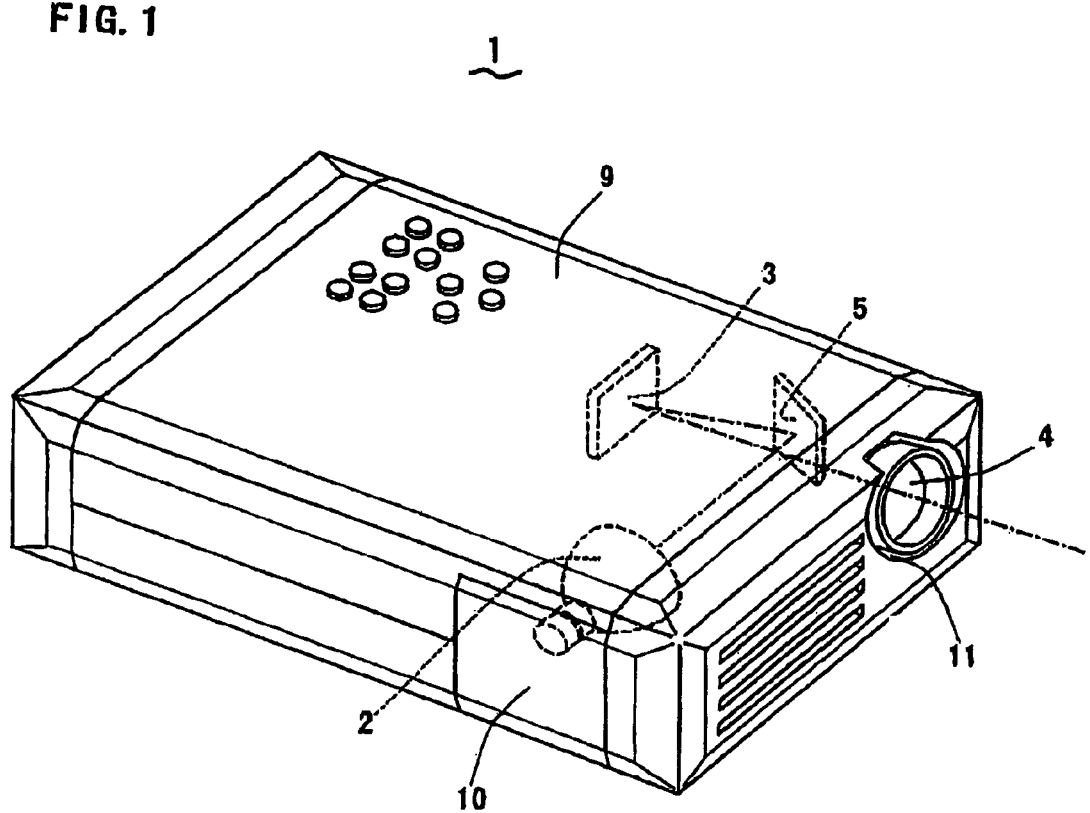
FIG. 1 is a schematic perspective view of an image projector according to one embodiment of the present invention.
Figure 2:
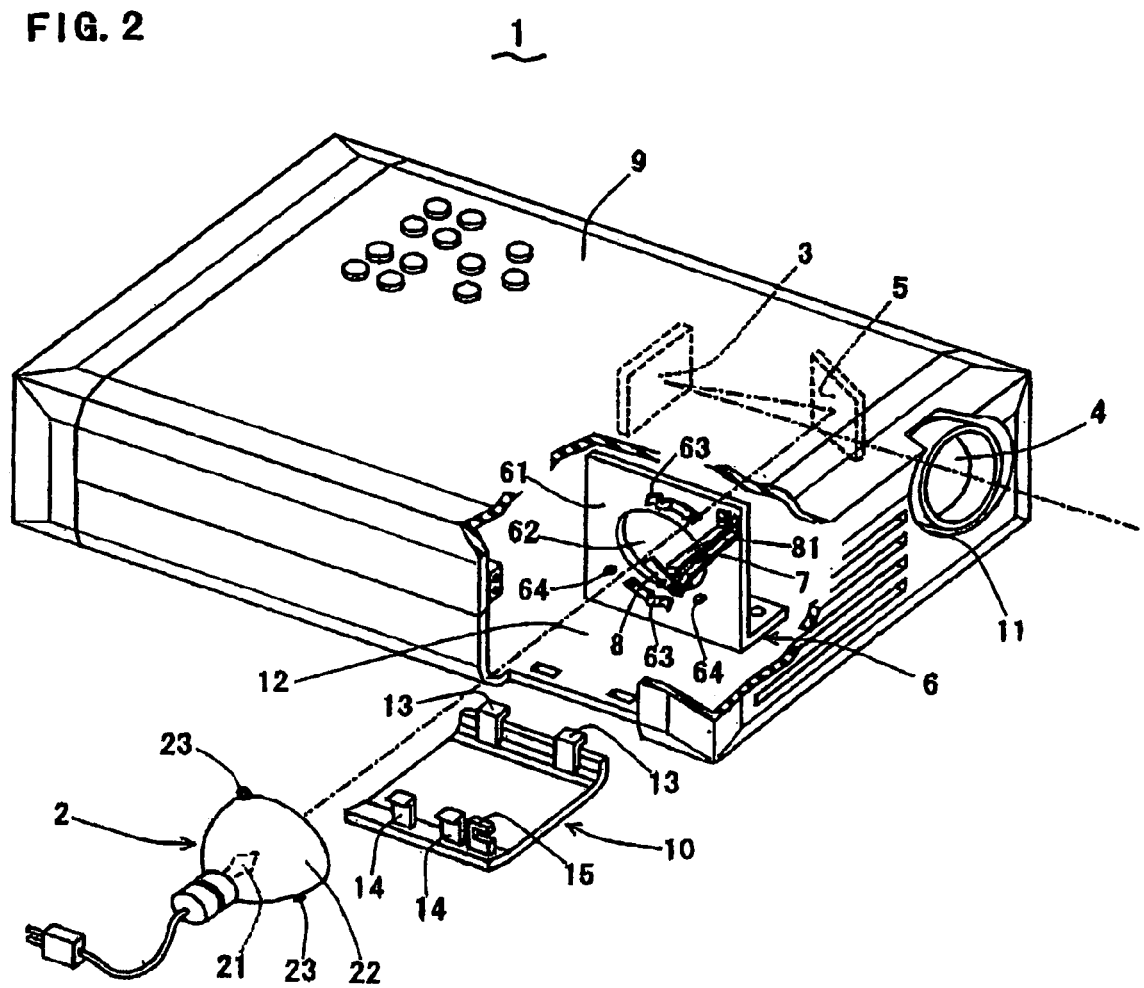
FIG. 2 is a perspective view, partially cut away, of the image projector, with a lamp detached.

FIGS. 1 and 2 show an image projector 1 that, based on image signals input from a personal computer, a video camera, and the like, forms images by an image forming element 3 using light emitted from a lamp 2 as a light source, and that projects the images through a projector lens 4 onto a screen or the like for display.

The image projector 1 includes the lamp 2, the image forming element 3, the projector lens 4, a reflecting mirror 5, a lamp mounting member 6, a temperature detecting lever 7, a door stopper 8, a housing 9, and a lamp door 10. The housing 9 has an opening 11 for image projection. The image projection opening 11 is formed in the front of the housing 9 for projection of images formed by the image forming element 3 out of the housing 9 through the projector lens 4.

Formed in the housing 9 is a lamp housing space 12 where the lamp 2 is placed. A side face of the housing 9 is configured so that the lamp door 10 can be detached therefrom and attached thereto. The lamp housing space 12 becomes open or closed when the lamp door 10 is detached from or attached to the housing 9. The lamp door 10 has hooks 13 and 14, for detachment and attachment, and a door locking portion 15.

The lamp 2 is adapted to emit light for image projection, and housed in the lamp housing space 12 in the housing 9 so that the lamp can be replaced. The image forming element 3 reflects the light from the lamp 2 to form images. The projector lens 4 projects the light reflected by the image forming element 3, i.e., the images formed by the image forming element 3, out of the housing 9. The reflecting mirror 5 is used to reflect the light emitted from the lamp 2 toward the image forming element 3. The image forming element 3, the projector lens 4, and the reflecting mirror 5 are arranged in the housing 9. The projector lens 4 is positioned to face the image projection opening 11 in the housing 9.

The lamp mounting member 6 is disposed in the lamp housing space 12 so that the lamp 2 can be attached thereto and detached therefrom in the space 12. The temperature detecting lever 7 is made of a shape memory alloy for detecting the temperature of the lamp 2 so as to change its position in response to the detected temperature. The temperature detecting lever 7 is fixed to the lamp mounting member 6. The door stopper 8 is actuated with displacement of the temperature detecting lever 7 to be caught by the door locking portion 15 of the lamp door 10. The door stopper 8 is supported by a supporting member 81 fixed to the lamp mounting member 6.

Figure 3A:
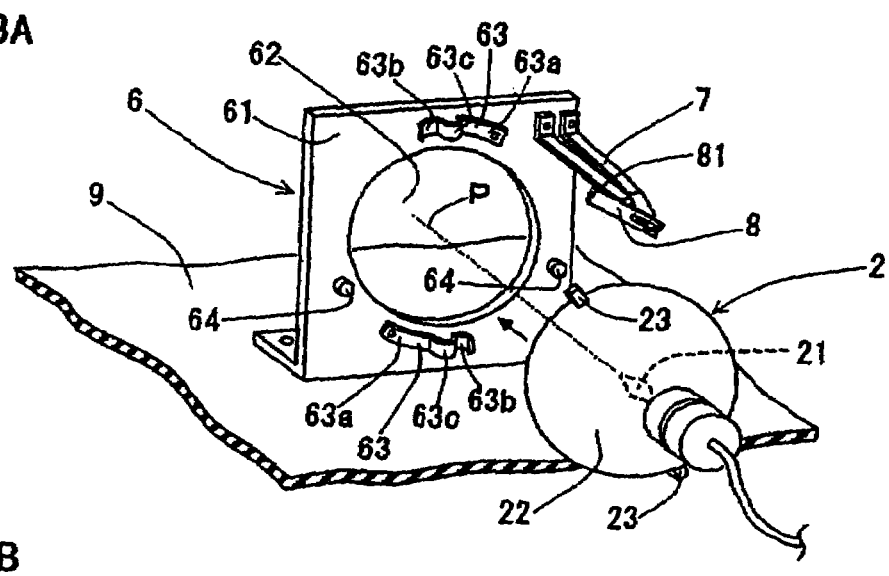
FIGS. 3A, 3B, and 3C are enlarged perspective views of part of the image projector, showing how to mount the lamp on a lamp mounting member.
Figure 3B:
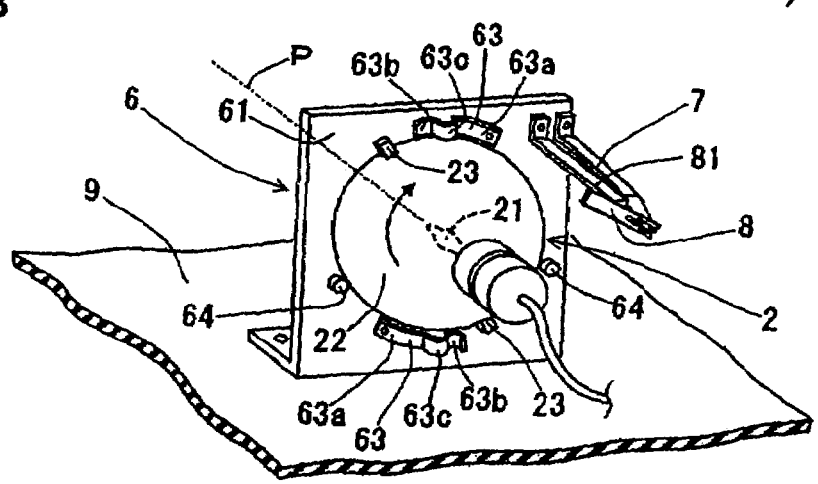
Figure 3C:
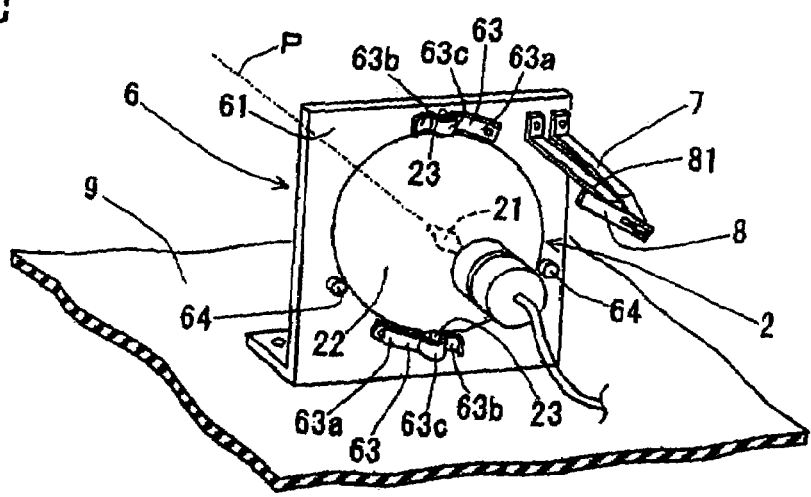

Referring now to FIGS. 3A, 3B, and 3C, the configuration of the lamp 2, the configuration of the lamp mounting member 6, and how the lamp 2 is mounted on the lamp mounting member 6 will be described.

The lamp 2 has a lamp bulb 21 for emitting light, a reflector 22 made of a material such as a glass for reflecting the light emitted from the lamp bulb 21, and lamp retention projections 23 formed on the reflector 22. The peripheral edge of the reflector 22 at the light emitting side is substantially a circle with center on the optical axis P of light emission. The lamp retention projections 23 extend outward at two locations on the peripheral edge of the reflector 22 at the light emitting side so as to be symmetric with respect to the optical axis P. The lamp retention projections 23 are formed of the same material used for the reflector 22 so as to be integrated with the reflector 22.

On the other hand, the lamp mounting member 6 includes a plate 61. This plate 61 is secured to the bottom of the housing 9 and has a window 62 for passing light emitted from the lamp 2, leaf springs 63 for retaining the lamp 2, and positioning projections 64 for positioning the lamp 2 over the window 62.

The window 62 is formed to be substantially a circle of slightly smaller diameter than the peripheral edge of the reflector 22 of the lamp 2. The leaf springs 63 are disposed at two locations on the plate above and below the window 62 so as to be symmetric with respect to the center of the window 62, for the purpose of holding the lamp 2. Each of the leaf springs 63 is arranged along the rim of the window 62 with one end 63a fixed on the plate 61 and the other end 63b free. Further, each of the leaf springs 63 has a concave portion 63c between the fixed end 63a and the free end 63b. The concave portion 63c is adapted to receive the lamp retention projection 23 of the lamp 2 so as to hold the lamp 2. The free end 63b of the leaf spring 63 extends in a counterclockwise direction as viewed from the lamp 2 side with respect to the fixed end 63a, and is curved to be away from the plate 61.

The positioning projections 64 are disposed on the plate at two locations on a circle concentric with the window 62, for the purpose of positioning the lamp 2 over the window 62. The two positioning projections 64 are located below the center of the window 62 at left and right of the window and spaced with a distance such that the reflector 22 of the lamp 2 can be slidably placed on the positioning projections. When the reflector 22 is placed on the positioning projections 64, the lamp 2 is positioned over the window 62 in a manner such that the optical axis P of the lamp 2 runs through the center of the window 62.

The lamp 2 is mounted on the lamp mounting member 6 in the following steps. First, as shown in FIG. 3A, the lamp 2 is arranged so that the edge of the reflector 22 at the light emitting side is opposite to the plate 61 with the lamp retention projections 23 not aligned with the leaf springs 63. Subsequently, as shown in FIG. 3B, the lamp 2 is pressed at the edge of the reflector 22 against the plate 61 so that the lamp 2 is placed on the two positioning projections 64, i.e., so that the periphery of the reflector 22 is in contact with the two positioning projections 64, and the lamp 2 is turned in the clockwise direction as viewed from the lamp 2 side. Since the peripheral edge of the reflector 22 of the lamp 2 is substantially a circle with center on the optical axis P, the lamp 2 is rotated about the optical axis. P. Therefore, even when the lamp 2 is turned, the optical axis P of the lamp 2 can be kept in position. Thus, the positioning of the lamp 2 can be maintained.

By further turning the lamp 2 in the clockwise direction, each of the lamp retention projections 23 is inserted between the plate 61 and the free end 63b of the leaf spring 63 to be received in the concave portion 63c as shown in FIG. 3C. As a result, the lamp 2 is held by the leaf spring 63 to be mounted on the lamp mounting member 6. In this state, the lamp 2 is kept in the proper position with the peripheral edge of the reflector 22 in contact with the two positioning projections 64.

Detachment of the lamp 2 from the lamp mounting member 6 is carried out by turning the lamp 2 counterclockwise. When the lamp 2 is turned in the counterclockwise direction, each of the lamp retention projections 23 is removed from between the plate 61 and the free end 63b of the leaf spring 63 so that the lamp 2 is released. In this manner, the lamp 2 is detached from the lamp mounting member 6.

According to the image projector 1 of the present invention as described above, the lamp 2 can be easily attached to and detached from the lamp mounting member 6 without having to use a screw.

Figure 4A:
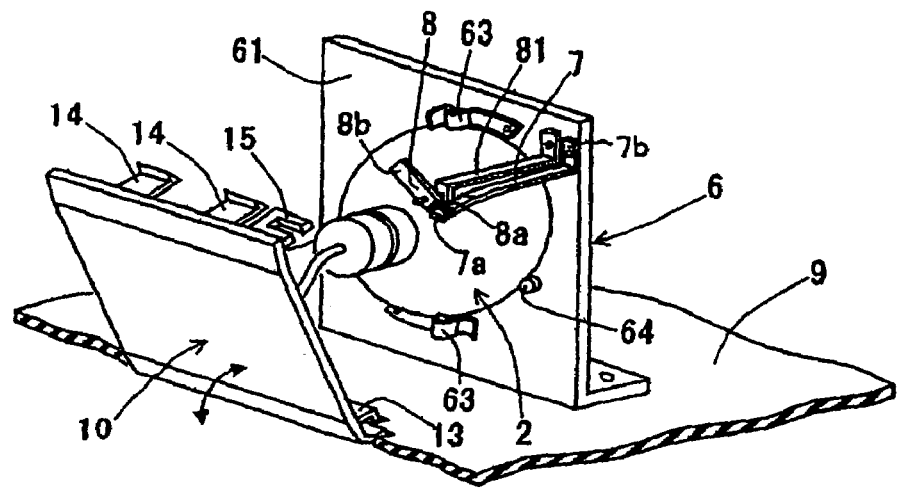
FIGS. 4A, 4B, and 4C are enlarged perspective views of part of the image projector, showing how to lock a lamp door.
Figure 4B:
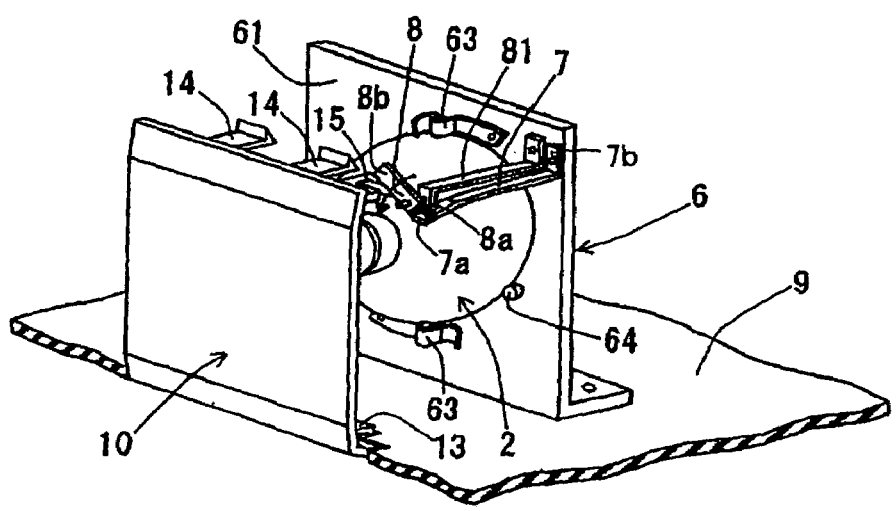
Figure 4C:
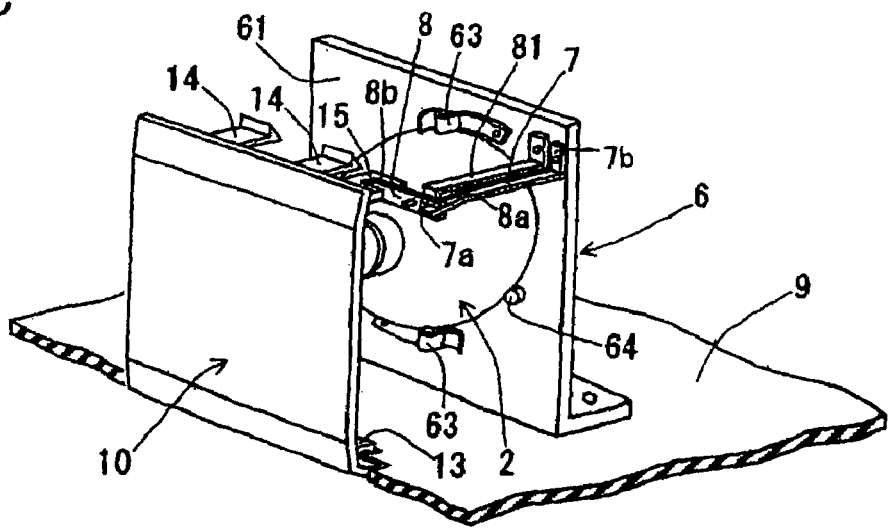

Referring now to FIGS. 4A, 4B, and 4C, the configuration of the temperature detecting lever 7, the configuration of the door stopper 8, and how to lock the lamp door 10 will be described.

The temperature detecting lever 7 is formed from a shape memory alloy as described above and fixed on the lamp mounting member 6. The temperature detecting lever 7 is shaped like a bar with one end 7b fixed on the lamp mounting member 6 and the other end 7a free. The temperature detecting lever 7 detects the temperature of the lamp 2 based on heat transferred via the lamp mounting member 6 from the lamp 2 as well as heat transferred via the atmosphere from the lamp 2. Depending on the detected temperature, the temperature detecting lever 7 deforms so that the free end 7a is displaced in the vertical direction. The free end 7a of the temperature detecting lever 7 moves upward from its original position when the lamp 2 reaches a high temperature, at which a user may possibly have a burn, for example, when touching the lamp 2, while the free end 7a of the lever returns to the original position when the lamp 2 is restored to the ordinary temperature, at which a user can be safe even when touching the lamp 2.

The door stopper 8 is supported by the supporting member 81 fixed on the lamp mounting member 6 as described above. This door stopper 8 is pivotably supported by the supporting member 81 and coupled at a first end 8a to the free end 7a of the temperature detecting lever 7. Accordingly, a second end 8b of the door stopper 8 is displaced in the vertical direction along with displacement of the free end 7a of the temperature detecting lever 7.

Meanwhile, the lamp door 10 has the door locking portion 15 as described above. The second end 8b of the door stopper 8 is caught by the door locking portion 15 when having moved down. The lamp door 10 is locked to be inhibited from opening operation, i.e., detachment from the housing 9, when the second end 8b of the door stopper 8 is caught in the door locking portion 15 of the door. When the second end 8b of the door stopper 8 is released from the door locking portion 15, the lamp door 10 becomes unlocked to be openable.

The locking mechanism for the lamp door 10 will be described in more detail. When the lamp 2 is at the ordinary temperature, the free end 7a of the temperature detecting lever 7 is at the original position such that the second end 8b of the door stopper 8 is away from the door locking portion 15 as shown in FIG. 4A. In this state, the lamp door 10 is openable and closable.

Once the lamp door 10 is closed and the lamp 2 is turned on, the temperature of the lamp 2 gradually rises. When the lamp 2 reaches a high temperature, the temperature detecting lever 7 deforms to raise the free end 7a thereof, which results in descent of the second end 8b of the door stopper 8 as shown in FIG. 4B. When the second end 8b of the door stopper 8 is further moved downward to be caught by the door locking portion 15 of the lamp door 10 as shown in FIG. 4C, the lamp door 10 becomes locked to be prohibited from being opened.

When the lamp 2 is turned off, the temperature of the lamp 2 gradually decreases. Then, when the lamp 2 reaches the ordinary temperature, the temperature detecting lever 7 returns to the original shape with the free end 7a moved down to the original position. At the same time, the second end 8b of the door stopper 8 ascends to its original position to be released from the door locking portion 15. As a result, the lamp door 10 is unlocked to be openable as shown in FIG. 4A.

According to the image projector 1 having such structure as described above, when the lamp 2 is at a high temperature, e.g., when it has been just switched off, the lamp door 10 is locked so that replacement of the lamp 2 is prohibited. Thus, accidents such as, for example, a burn can be prevented from occurring, and replacement of the lamp can be carried out safely.

The present invention has been described above using a presently preferred embodiment, but those skilled in the art will appreciate that various modifications are possible. Accordingly, all such modifications are intended to be included within the sprit and scope of the present invention. For example, although the lamp retention projections 23 are formed at two locations on the lamp in the above described embodiment, they can be formed at three or more locations for example on the lamp. In such a case, leaf springs 63 are also provided at three or more locations for the respective lamp retention projections 23. Further, the plate 61 can be divided into a plurality of segments. Furthermore, the temperature detecting lever 7 and the door stopper 8 are not necessarily provided on the lamp mounting member 6, but can be provided on the side wall or the upper wall of the housing 9, or the like.

This application is based on Japanese patent application 2003-369604 filed in Japan dated Oct. 29, 2003, the contents of which are hereby incorporated by references.

What is claimed is:

1. An image projector for projecting an image, comprising:
   a lamp having a lamp bulb for emitting light and a reflector for reflecting the light emitted from the lamp bulb;
   an image forming element for forming the image using the light from the lamp;
   a lamp mounting member adapted so that the lamp is attachable to and detachable from the lamp mounting member, thereby allowing the lamp to be replaced alone; and
   a housing in which the lamp, the image forming element, and the lamp mounting member are housed,
   wherein the lamp has a lamp retention projection,
   wherein the lamp mounting member includes a retainer for receiving the lamp retention projection so as to hold the lamp,
   wherein the lamp retention projection extends outward from a peripheral edge of the reflector at a light emitting side,
   wherein the lamp mounting member includes a plate with which the edge of the reflector of the lamp at the light emitting side is brought into contact, the plate having a window to pass the light emitted from the lamp, and
   wherein the retainer is a leaf spring arranged along a rim of the window with one end fixed on the plate and the other end free, the leaf spring having a concave portion for receiving the lamp retention projection.

2. The image projector according to claim 1,
   wherein the reflector of the lamp is configured to be substantially round at the peripheral edge at the light emitting side; and
   wherein the lamp mounting member further includes a positioning projection for positioning the lamp over the window, the positioning projection being located on the plate near the rim of the window so that the reflector of the lamp can be slidably placed thereon.

3. An image projector for projecting an image, comprising:
   a lamp having a lamp bulb for emitting light and a reflector for reflecting the light emitted from the lamp bulb;
   an image forming element for forming the image using the light from the lamp;
   a lamp mounting member adapted so that the lamp is attachable to and detachable from the lamp mounting member, thereby allowing the lamp to be replaced alone;
   a housing in which the lamp, the image forming element, and the lamp mounting member are housed;
   a lamp door attached to the housing for opening and closing a lamp housing space in the housing where the lamp is placed;
   a temperature detecting lever that is a shape memory member having one end fixed on the lamp mounting member and the other end that is free and adapted to deform with temperature; and a door stopper coupled to the free end of the temperature detecting lever for locking the lamp door, wherein the lamp door has a door locking portion capable of catching the door stopper, and the door locking portion prohibits the lamp door from being opened under high temperature conditions while allowing the lamp door to be opened under ordinary temperature conditions.

* * * * *